March 14, 1967  B. BORISOF  3,309,052
PLASTIC CLIP AND METHOD OF AND APPARATUS FOR MAKING SAME
Filed Jan. 17, 1966  2 Sheets-Sheet 1

Inventor:
Bernard Borisof
By Zabel, Baker, York,
Jones & Dithmar
Attorneys

March 14, 1967     B. BORISOF     3,309,052
PLASTIC CLIP AND METHOD OF AND APPARATUS FOR MAKING SAME
Filed Jan. 17, 1966     2 Sheets-Sheet 2
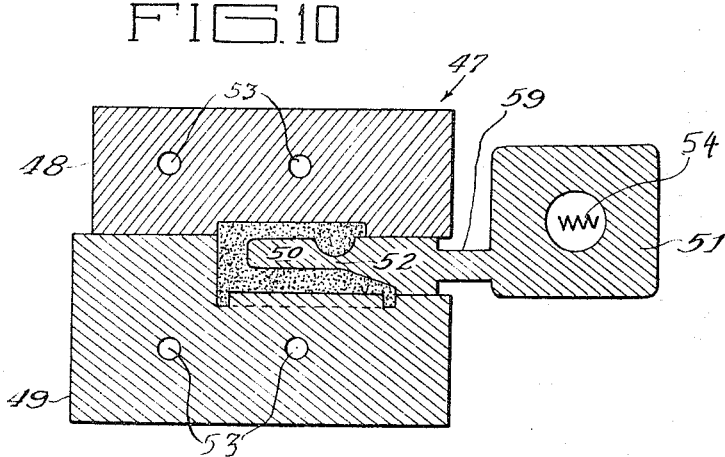
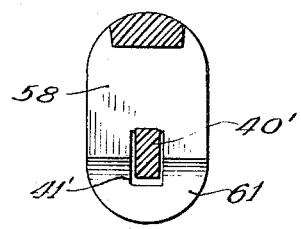
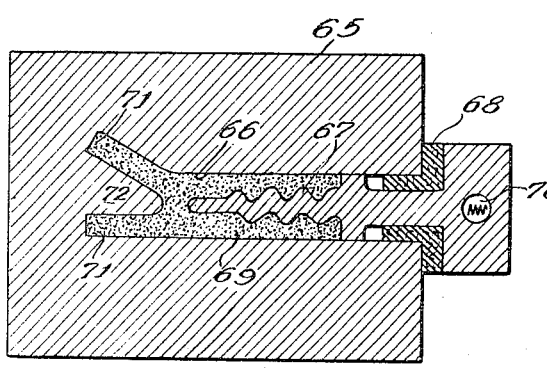
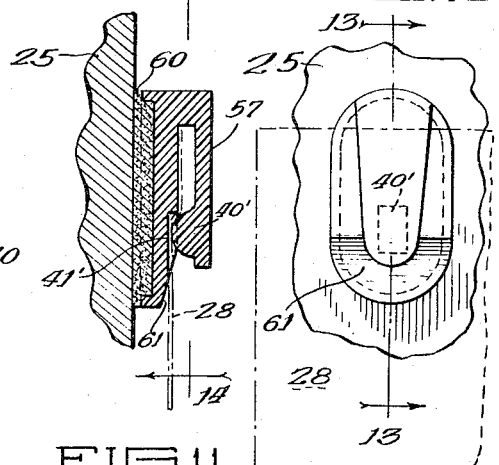
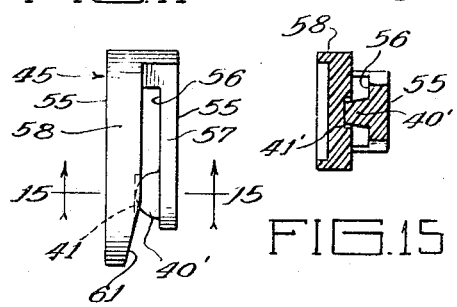
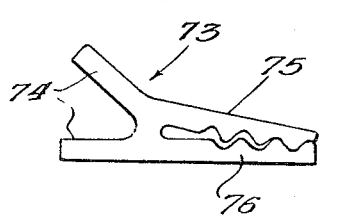
Inventor:
Bernard Borisof
By Zabel, Baker, York,
Jones & Dithmar
Attorneys

3,309,052
PLASTIC CLIP AND METHOD OF AND APPARATUS FOR MAKING SAME
Bernard Borisof, Chicago, Ill., assignor to Lectro-Stik Company, Chicago, Ill., a partnership
Filed Jan. 17, 1966, Ser. No. 521,074
12 Claims. (Cl. 248—205)

This invention relates to clips.

There are two aspects of my invention: first, the clip is particularly well adapted for wall mounting by adhesive means, and second, the clip is made from plastic material.

In its first aspect, my invention relates to an adhesive clip for holding posters on windows, schoolwork on blackboards, bulletins and decorations on walls, job tickets on work in process, price tickets on merchandise, and similar applications.

It is customary to use wall mounting devices in the form of cellophane tape, tacks, thumbtacks, and wire staples, but all of these have drawbacks. Tape is awkward to use, difficult to remove after long use, tears paper articles, is often unsightly, generally not reusable, requires an expensive tear off spool, and tends to be costly for schoolroom use. Tacks and staples leave holes and cannot be used on hard surfaces like glass or blackboards; they require tools, and cannot be reused. Thumbtacks require soft bulletin boards and are a hazard when dropped.

Yet other mounting devices such as magnets, and clamps held by strings, suction cups, or screws, all of which are limited in utility, in convenient, and relatively expensive, are much less popular than tape, tacks, and staples.

It is an object of this invention to provide a wall mounting device which is more functional and convenient, and costs less per reuse than a bit of tape, or a staple, or a reusable thumbtack.

It is another object of the invention to provide a wall mounting device which may be readily placed in position, using only one hand, only finger tip pressure, and requiring no tools.

Another object is to provide a wall mounting device in the form of a holder or clip which remains on the wall while one or more papers and other articles may be inserted, or removed, hundreds or thousands of times.

A further object of this invention is to provide a holder which can be adhered to glass, wood, metal, paper, paint, cloth, or any other hard or soft, rough or smooth surface; and which may be removed from the surface without damage and remounted hundreds of times anywhere.

An object is to provide a holder which embodies a one-piece clip, is compact and neat in appearance, and wherein the clip does not obscure, tear, or puncture the poster.

A further object is to provide an adhesive clip which may be secured to a vertical wall or other surface and in which the forces imparted to the device incident to the insertion or removal of paper do not adversely affect the adhesive bond with the supporting surface.

According to the present invention, such forces are minimized by a V-shaped entry, and the distortion of the clip incident to insertion is largely isolated from the base which carries the adhesive, with the result that only a relatively small area of adhesive bond is required, such, for example, as one-third of a square inch.

Furthermore, by using a mastic type pressure sensitive adhesive, which additionally functions as a deformable spacer element between the clip proper and the supporting surface, any small displacements of the clip as a whole incident to operation may be taken up by the spacer element without unduly stressing the bond itself.

Thus it is possible to provide a small and inexpensive device which is of considerable utility in the home, and in stores and schools, for mounting posters, signs, memoranda, pictures, and the like, and wherein the adhesive bond will not fail incident to operation even though the adhesive area is relatively small.

A clip of this type may be made of one piece of metal bent into a U-shape, and then crimped along a short length until the legs clamp tightly. The clip may also be made of one piece of plastic having advantages of low cost, unlimited design shape, and freedom from corrosion. But it is difficult to crimp or deform the plastic so that the plastic material will take a set and hold the parts in actual contact with each other, without causing some defect in the material. At best, such necessarily localized mechanical reshaping results in concentrated high stresses in the piece which may result in fracture before an optimum number of flexures of the clip have been obtained.

It is another object of this invention, in a preferred embodiment, to provide a one-piece plastic clip which carries an evenly distributed internal tensile stress drawing the legs of the clip tightly together. Such a clip, being inexpensive and durable, is also suitable for use in clothespins, hair curlers, letter clamps, tweezers, pants hangers, and other similar applications.

According to the second aspect of my invention, the clip is made of a synthetic resin, and molded in such a manner as to produce internal stresses which bias the legs toward each other.

Ordinarily, it is not possible to injection mold or extrude a plastic piece having two positions which are to be in contact with each other. In order to prevent fusion of the two parts, it is necessary to keep the parts separated by a member of the mold, which means that the parts will not be in contact with each other after the piece has been removed from the mold. After the piece has been molded, it is difficult to deform the same in such a manner that the resin material will take a set such that the parts are in actual contact with each other.

Other objects, features, and advantages of my invention will become apparent as the description proceeds.

With reference to the drawings, in which like reference numerals designate like parts:

FIG. 10 is a section through molding apparatus illustrating one way of creating the post solidification shrinkage stress on the inner surface;

FIG. 11 is a side elevation of a further embodiment of my invention;

FIG. 12 is an elevation of the FIG. 11 clip showing the same mounted on the wall; —

FIG. 13 is a vertical section taken along line 13—13 of FIG. 12;

FIG. 14 is a vertical section taken along line 14—14 of FIG. 13;

FIG. 15 is a horizontal section taken along line 15—15 of FIG. 11;

FIG. 16 is a section through an extruding die showing another way of creating the post solidification shrinkage stress on the inner surface; and FIG. 17 is an elevation of a still further embodiment of my invention.

Figure 3:
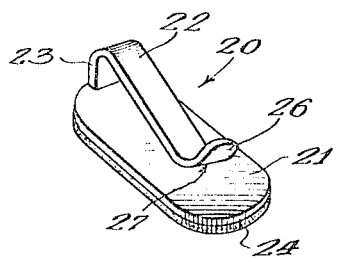
FIG. 3 is a vertical section taken along line 3—3 of FIG. 2.
Figures 1, 2:
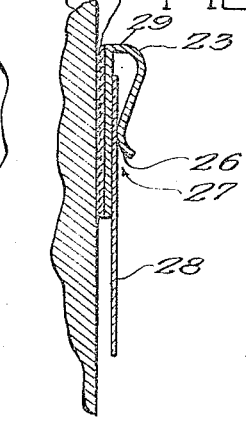
FIG. 1 is a perspective view of a clip embodying my invention.
FIG. 2 is an elevation of the clip mounted on a wall and holding a sheet of paper.

With reference now to FIGS. 1 to 3, the clip 20 has two legs in the form of a base 21 and a flexible leaf 22, connected by a connecting portion 23.

The base 21 is provided with a coating or layer of adhesive material 24 so that the same may be adhered to a wall surface 25.

The outer end of the flexible leaf 22 has a curved surface 26 to provide a V-shaped entry 27. This facilitates the insertion of a sheet of paper 28.

The flexible leaf is biased into contact with the base 21, and therefore the insertion of a sheet of paper 28 into the clip will force the legs apart. The V-shaped entry 27 provides a camming action which requires only a light force to open the clip, which force is applied by the edge of the paper, and thus reduces the shear stress on the adhesive bond. Since the clip does not need to be pried open manually, it is forced open only to the small extent which equals the thickness of the paper, and no peeling force is applied to the clip.

The base 21 is of greater cross section either in width or thickness, than the flexible leaf 22 so that practically all flexing takes place either in the flexible leaf 22 or the connection portion 23. As a result, the base is sufficiently stiff so that the adhesive bond between the adhesive 24 and the wall 25 will not fail due to localized overstressing. The V-entry 27, as above described, permits the insertion of a sheet of paper or other flexible material without causing any prying or twisting stress on the clip as a whole, which would also tend to cause failure of the adhesive bond.

As a result, it is possible to provide an adhesive clip having a relatively small adhesive area. In the embodiment shown in FIGS. 1, 4, 6 and 11, the area is less than one-third of a square inch.

The clip 20 may be made of either metal or synthetic resin, and it is provided with a crimp 29 which prestresses the legs so that the flexible leaf 22 is urged into engagement with the base 21. Thus, thin sheets will be held as well as thicker sheets.

Figures 4, 5:
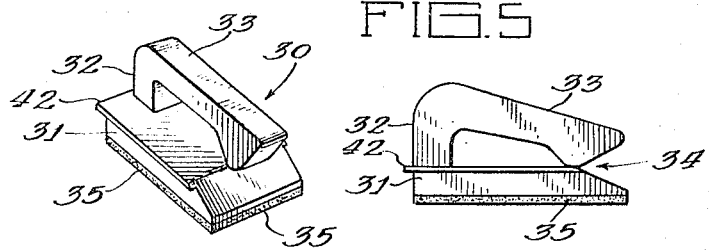
FIG. 4 is a perspective view of another embodiment of the invention, being a molded plastic clip.
FIG. 5 is an elevation of FIG. 4.
Figure 9:
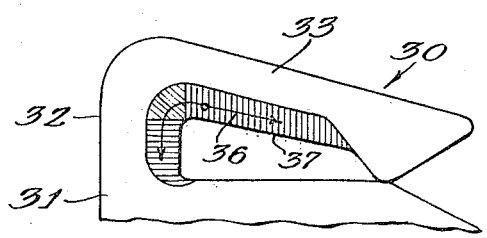
FIG. 9 is a stress diagram of FIG. 5 clip.

In FIGS. 4 and 5 is shown a clip 30 which may be injection molded of synthetic resin. This clip has a rigid base 31, a connecting portion 32, a flexible leaf 33, a V-shaped entry 34, and an adhesive coating 35. A flange 42 on the base 31 facilitates breaking the adhesive bond incident to removal. The two legs 31, 32 are urged together into contact by a post-solidification tensile shrink stress on its inner surface as shown by the arrow 36 in FIG. 9. This type of stress may be produced by melting the inner surface 37 of the clip, clamping the legs together at their outer ends, and allowing the molten portion to solidify.

Solidification of thermoplastic resins is accompanied by a certain amount of shrinkage. Thus a post-solidification tensile shrink stress 36 is produced. This tension stress is distributed along the inner surface 37, and tapers off gradually at either end, as diagrammatically illustrated by the shaded portion of FIG. 9.

Figure 6:
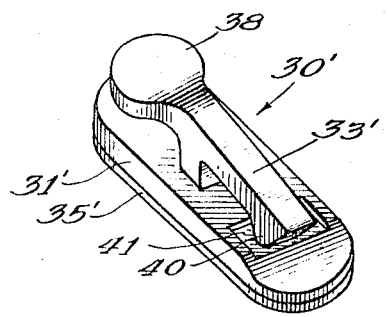
FIG. 6 is a perspective view of another embodiment which has a squeeze-to-open arm.
Figure 7:
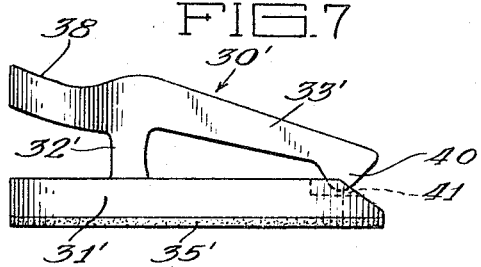
FIG. 7 is an elevation of FIG. 6.
Figure 8:
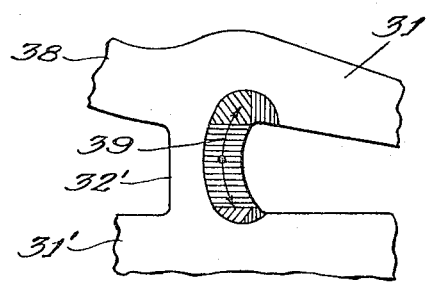
FIG. 8 is a stress diagram of FIG. 7 clip.

In FIGS. 6 and 7 is shown another embodiment 30' in which the movable leaf 33' has an extension 38 which may be pressed by the finger tip to open the clip. Optionally, the post-solidification internal stress 39 is localized on the inner surface of the connecting portion 32' as shown in FIG. 8. Thus the connecting portion 32' serves as a pivot member, and the extension 38 as an operating arm, the leg or leaf 33' being more rigid than the connecting portion 32'.

The movable leaf has a boss 40 at its tip, and the base 31' has a recess 41 where it is contacted by the boss. Thus when a sheet of material is clamped, it is contacted by two or more points on the base and is held more securely.

FIG. 10 illustrates one way of creating the post solidification shrinkage stress in an injection molded clip, such as the clip 45 of FIGS. 11 to 15. The molding apparatus 47 of FIG. 10 comprises a top mold part 48, a bottom mold part 49, and a core 50. The core is mounted on a slide 51 and connected thereto by a neck 52. A feature of the invention is that the core 50 is arranged to lose heat appreciably slower than the mold parts 48 and 49. Thus the outer surface 55 of the clip 45 will solidify prior to the inner surface 56.

The clip 45 is formed from a synthetic resin, such as an acetal homopolymer (unbranched polyoxymethylene) or an acetal copolymer which is based on trioxane, both of which are commonly referred to as "acetal," and both of which have a relatively high shrinkage rate (2.2%).

As previously pointed out, solidification of thermoplastic resins is accompanied by a certain amount of shrinkage. The arrangement of the mold is such that the inner surface 56 remains molten until after the outer surface 55 has solidified. The subsequent solidification of the inner surface 56 is accompanied by a shrinkage which, however, is restrained by the already solid surface 55, thus producing an internal stress. After the clip is removed from the mold, this shrinkage stress tends to bend the legs toward each other and to close the clip tightly. This internal stress produces an effect like that of a tension spring which is built into the inner surface. The stress is similar to that shown diagrammatically in FIG. 9.

Other synthetic resins which are suitable are the high density polyolefins such as polyethylene having a shrinkage rate of 2.5%, and polypropylene having a shrinkage of 1.6%. Since practically all thermoplastic and thermosetting resins shrink on cooling or on setting, respectively, practically any such shrinkable resin is suitable. Since the object is to cause the outer ends of the leg to become prestressed into contact with each other, the length and thickness of the leg 57 and the width of the gap to be closed, corresponding to the thickness of the neck 52, must be correlated with the shrinkage rate of the resin in order to obtain the desired result.

In the embodiment shown in FIGS. 11 to 15 the length of the base 58 is ¾" and the thickness of the neck 52 is about 1/32 inch, the other dimensiosn being proportional. Under these conditions, acetal has a sufficient shrinkage rate to close the 1/32" gap.

The mold parts 48 and 49 have temperature controlling water circulating in the ducts 53 so that the average mold temperatures near the cavity are low enough to give fairly rapid solidification of the resin. Low temperatures can be achieved by providing a relatively large mass of material around the cavity to carry away heat. This temperature is in the range of from 100° F. to 200 F. depending on the resin, the shape of the clip, and molding considerations.

The temperature of the core 50 is maintained at from 25 F. to 100° F. higher than the outer parts, and it runs in the range of 125° F. to 300° F. This higher temperature is maintained by means of a heating element 54, or any other heating means, as well as by the reduced section at 59, or by suitable heat insulation, including spacing, which prevents loss of heat from the core.

For other clip dimensions, resins having less or greater shrinkage rates are suitable, ranging from acrylic, cellulose acetate, and polystyrene (0.4%) and nylon 6/10 (1.6%) up to Teflon (tetrafluoroethylene fluorocarbon resins—4% shrinkage rate).

The stiff base 58 may desirably be flanged, providing a cup-shaped member which can receive a body of mastic 60 shown in FIG. 13 which serves as the adhesive layer for securing the clip 45 to a vertical wall surface 25. The mastic is somewhat yieldable and preferably of the pressure sensitive type as pointed out in my Patent No.

3,165,283 granted Jan. 12, 1965. Thus the clip may be removed from the wall and replaced a number of times, which contributes substantially to its utility.

Also, the yieldable characteristic of the mastic permits it to accommodate itself to rough or non-planar surfaces, developing a maximum of bonded area, and thus enables it to resist deformations or movements of the base incident to the insertion and removal of the stiffer paper stock to the end that the adhesive bond between mastic 60 and the wall surface 25 will not be broken.

The sloping surface 61 of the base 58 intersects and merges with the bottom wall of the recess into which the boss 40' extends. This imparts a transverse curvature to a sheet of paper received within the clip which permits the clip, when facing upwardly, to support a sheet of paper from the bottom. Due to the transverse curvature, a small sheet will not flop over due to its own weight. This characteristic also permits the sheet to be held at one end with a transverse curvature imparted by the fingers so as to stiffen the same. Then the far end of the sheet may be inserted between the boss 40' and the base. The cooperation of the boss 40' and the recess does not eliminate the transverse curvature, with the result that the sheet will transmit the force necessary to effect entry.

FIG. 16 shows another way of creating the post solidification shrinkage stress on the inner surface of an extruded clip, such as the extruded clip 73 of FIG. 17. In FIG. 16, the extrusion die block 65 has an opening 66 formed therein and a core 67 located within the opening. The core 67 is thermally insulated from the die block 65 by insulating material 68. Since the heat transmitted to the die parts 65 and 67 by the resin 69 is lost more rapidly by the die block 65 than by the core 67 due to conduction and radiation, the average temperature of the core will be higher than the average die block temperature with the result that the internal closing stresses will be produced. A heating element 70 may be provided for the core where a greater temperature difference is desired, and also the core 67 may be extended longitudinally beyond the face of the die, and cooling air or water may be used on the external surface of the clip to make sure it has been solidified prior to the solidification of the inner surface.

As an illustration of the differential cooling action, the die block 65 contains two cavities 71 which are separated by a web portion 72. Since the web portion 72 will be maintained at substantially the same temperature as the remainder of the die block 65, no stresses will be produced in the surface of the arm portions 74 of the resulting clip 73 formed by the cavities 71, and thus the arms 74 will stay the same distance apart as the openings 71, whereas the leg portions 75 and 76 of the clip 73 are prestressed, and after leaving the die will move into contact with one another.

The extended strip is then cut into separate pieces, each of which constitutes a clip 73, as shown in FIG. 17. The clip 73 not only has the prestressed legs 75 and 76, but also operating arms 74 by which the clip can be opened.

The prestressed clip 73 is suitable for use as a paperclip, clothes pin, or a hair curler.

Thus this invention in its preferred embodiment provides an improved clip because of this unique combination of features:

A one-piece plastic clip,

A flexible member with a distributed post-solidification internal stress urging the clip to a closed position, A rigid member carrying a layer of adhesive on its outer surface, and V-shaped entry.

An unexpected result of this combination is the advantageously small size and low cost.

Although only preferred embodiments of my invention are shown herein, it will be understood that various modifications and changes in the method and construction shown may be made without departing from the spirit of my invention as pointed out in the appended claims.

I claim:

1. An adhesive clip for wall mounting comprising a base, adhesive means overlying said base for securing same to a supporting surface, a flexible leaf integral with said base, said flexible leaf being prestressed toward said base, with the outer end of said leaf in contact with said base, and means at the outer end of said leaf providing a V-shaped entry for sheet material inserted between said leaf and said base, said clip being made of a synthetic resin, and said prestressed characteristic being a post solidification shrinkage stress on the inner surface of said flexible leaf.

2. An adhesive clip as claimed in claim 1 in which said flexible leaf includes an extension providing an operating arm for opening said clip.

3. An adhesive clip as claimed in claim 1 in which said base is provided with a recess, said flexible leaf having a portion at its outer end extending into said recess.

4. An adhesive clip as claimed in claim 1 in which the wall contacting area of said adhesive means is less than 0.3 square inch.

5. A clip comprising a U-shaped article formed of a synthetic resin and being prestressed into closed position, said prestressed characteristic comprising a fiber stress in tension along the inner surface of said U-shaped article.

6. A clip as claimed in claim 5 in which said U-shaped article includes two legs and a connecting portion, said legs being in contact with each other at their outer ends.

7. A clip as claimed in claim 6 in which said U-shaped article includes two arms extending from said connecting portion in a direction substantially opposite to the direction in which said legs extend therefrom, the outer ends of said arms being spaced from each other.

8. A clip as claimed in claim 6 in which one of said legs is thicker than the other and constitutes a base, the other of said legs constituting a flexible leaf, and a layer of adhesive material overlying said base for wall mounting purposes, said base being relatively stiff so that any distortion thereof incident to displacement of said flexible leaf is less than the distortion required to break the adhesive bond between said adhesive layer and a supporting surface.

9. A clip as claimed in claim 8 in which said adhesive material is a body of tacky pliable material having a pressure sensitive surface.

10. A clip as claimed in claim 5 in which said U-shaped article comprises a base, a flexible leaf, and a connecting portion, the outer end of said base having a sloping surface which is outwardly divergent with respect to said flexible leaf and which faces same, a recess formed in said base and having a bottom wall which is substantially parallel to the medial plane of said U-shaped article which extends between said base and said leaf, said bottom wall intersecting said sloping surface and merging therewith, and a boss on the outer end of said flexible leaf and extending into said recess, said boss having a sloping surface which is opposite to said first sloping surface and cooperates therewith to provide a V-shaped entry for said clip.

11. An adhesive clip for wall mounting comprising a base, adhesive means overlying said base for securing same to a supporting surface, a flexible leaf integral wtih said base, said flexible leaf being prestressed toward said base, with the outer end of said leaf in contact with said base, and means at the outer end of said leaf providing a V-shaped entry for sheet material inserted between said leaf and said base, said base being provided with a flange extending substantially parallel to said supporting surface to facilitate removal of said clip from said supporting surface.

12. A clip comprising a U-shaped article formed of a synthetic resin and being prestressed into closed position, said prestressed characteristic comprising a post solidification shrinkage stress along the inner surface of said U-shaped article.

References Cited by the Examiner
UNITED STATES PATENTS

| | | | |
|---|---|---|---|
| 1,368,868 | 2/1921 | Wertman | 248—316 X |
| 1,928,536 | 9/1933 | Heinlen et al. | 24—137 |
| 2,340,521 | 2/1944 | Engert | 248—205 X |
| 2,713,469 | 7/1955 | Wright | 248—229 |
| 2,723,815 | 11/1955 | Browning | 248—29 |
| 2,744,631 | 5/1956 | Toombs | 210—163 |
| 2,765,998 | 10/1956 | Engert | 248—205 |
| 2,855,242 | 10/1958 | Holmes | 248—206 X |
| 2,931,086 | 4/1960 | Rose | 24—137 |
| 3,015,869 | 1/1962 | Rapata | 24—213 |
| 3,016,224 | 1/1962 | Hall | 248—205 |
| 3,136,515 | 6/1964 | Potruch | 248—62 |
| 3,161,436 | 12/1964 | Hood | 264—229 X |

CLAUDE A. LE ROY, *Primary Examiner.*